Feb. 20, 1968     L. H. COOK     3,370,090
UREA SYNTHESIS PROCESS
Filed Sept. 30, 1965
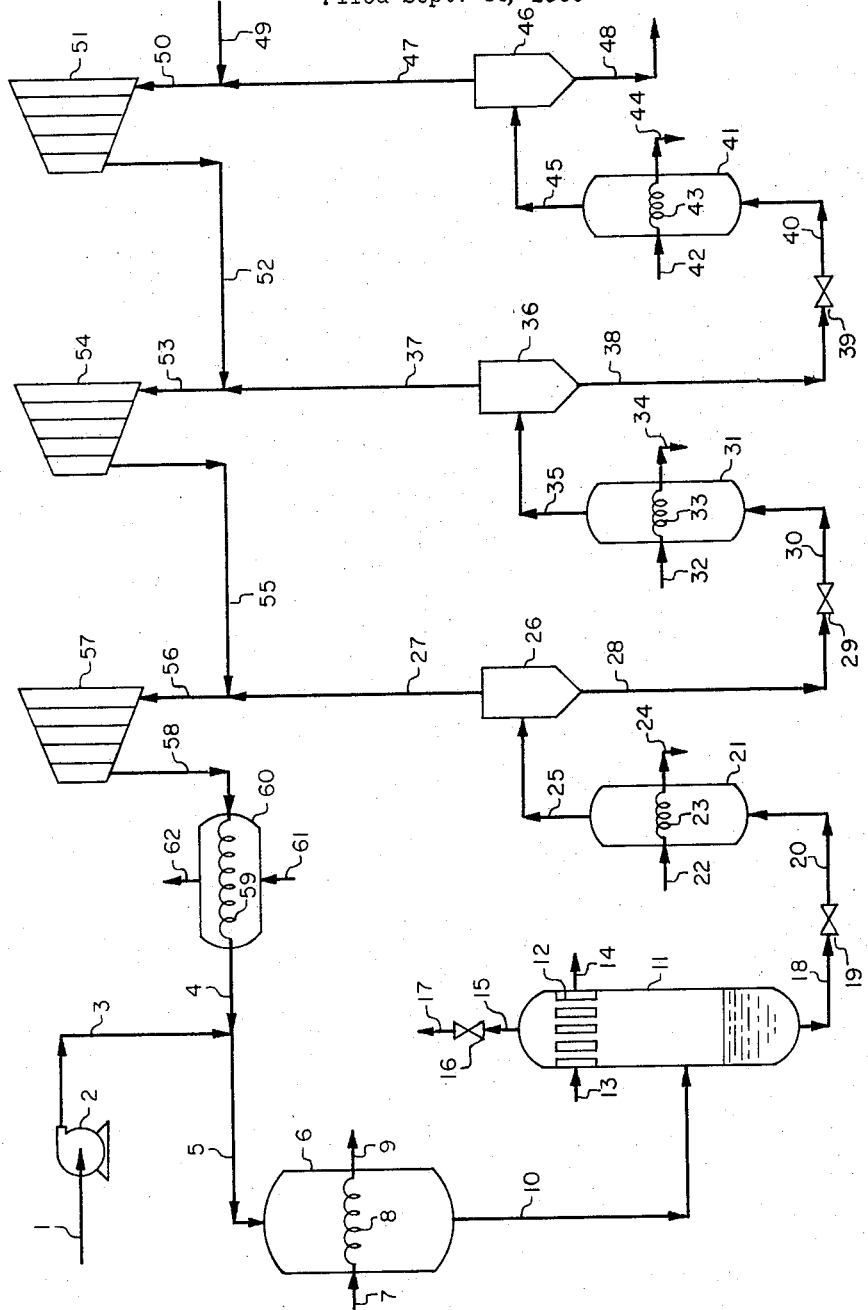
LUCIEN H. COOK
INVENTOR.
BY J. T. Chaboty
AGENT

United States Patent Office 3,370,090
Patented Feb. 20, 1968

3,370,090
UREA SYNTHESIS PROCESS
Lucien H. Cook, Port Washington, N.Y., assignor to Chemical Construction Corporation, New York, N.Y., a corporation of Delaware
Filed Sept. 30, 1965, Ser. No. 491,675
16 Claims. (Cl. 260—555)

The present invention relates to the synthesis of urea from ammonia and carbon dioxide at elevated temperature and pressure, in which the byproduct off-gas consisting of unconverted process components is completely recycled to the synthesis step in the gaseous state by means of adiabatic compression. An improved process sequence has been devised, in which the gaseous carbon dioxide feed stream is added to the off-gas stream prior to compression, thus providing improved efficiency in adiabatic compression. In addition, when the off-gas is generated in a plurality of stages at successively reduced pressure levels, the gaseous carbon dioxide feed stream is added to the off-gas from the last stage which is at lowest pressure, thus permitting direct recycle of this low pressure off-gas in the gaseous state by adiabatic compression, and eliminating the prior art sequence of recycling low pressure off-gas by absorption in aqueous liquid solution and compression of the solution, followed by evolution of the off-gas from the solution at elevated pressure by heating.

The synthesis of urea by the reaction between ammonia and carbon dioxide at elevated temperature and pressure is an equilibrium reaction which does not go to completion in practice. The initial reaction between ammonia and carbon dioxide results in the formation of ammonium carbamate, which under the reaction conditions is partially dehydrated to urea. An excess of ammonia is usually provided to produce a higher equilibrium conversion of ammonium carbamate to urea, and consequently the synthesis autoclave effluent generally contains ammonium carbamate derived from the initial combination of carbon dioxide and ammonia, and excess free ammonia, in addition to product urea and water. The ammonium carbamate and excess free ammonia are removed from the effluent process stream by heating this stream at reduced pressure, to generate a mixed off-gas stream containing ammonia, carbon dioxide and water vapor, leaving a residual product aqueous urea solution. Heating of the effluent stream to remove ammonium carbamate and free ammonia is generally carried out in a plurality of stages, at successively reduced pressure. In a complete recycle synthesis facility, this off-gas must be recycled to urea synthesis for eventual conversion of its ammonia and carbon dioxide components to urea.

Numerous procedures have been developed or proposed for the recycle of the unconverted ammonia and carbon dioxide components in the off-gas to urea synthesis. Thus, it has been proposed to recycle these reactants to the urea synthesis autoclave as an aqueous ammonia-ammonium carbamate solution or slurry. Other commercial processes are based on the use of a hydrocarbon oil or the liquid ammonia feed stream as the slurrying agent for ammonium carbamate.

It has also been proposed to recycle the off-gas as a hot gas stream, which is compressed at elevated temperature to urea synthesis pressure. The compressed feed streams of ammonia and carbon dioxide are then added to the compressed off-gas, and the mixture is passed into the urea synthesis autoclave. In such a procedure, it is necessary to maintain the off-gas stream during compression at temperature levels above the condensation point of solid ammonium carbamate, in order to prevent excessive wear on the compressor due to solids abrasion. An early prior art process of this nature is described in U.S. Patent No. 1,429,483, which formed the basis for a commercial application in Germany as described in P.B. Report No. 47,773, entitled, "Urea Manufacture at I.G. Farbenindustrie." More recent developments involving adiabatic or substantially adiabatic compression of the recycling off-gases are described in U.S. Patent No. 3,200,148 and U.S. patent application No. 246,747 filed Dec. 24, 1962, now Patent No. 3,232,985.

The present invention provides an improved process sequence for direct recycle of off-gas to urea synthesis by adiabatic compression, as compared to the process sequences described in U.S. Patent No. 3,200,148 and U.S. patent application No. 246,747. In the present invention, the gaseous carbon dioxide feed stream is added to the off-gas stream prior to compression, thus attaining improved efficiency in adiabatic compression. As discussed supra, in most instances the off-gas is generated in a plurality of stages at successively reduced pressure levels. In this case, the gaseous carbon dioxide feed stream is most suitably added to the lowest pressure off-gas derived from the last stage of off-gas generation. This modification produces a highly advantageous result, in that it permits the direct recycle of low pressure off-gas by adiabatic compression of the mixture of off-gas and carbon dioxide, which could not be attained in the adiabatic compression of off-gas in the prior procedures discussed supra. In these prior sequences, the low pressure off-gas could not be effectively recycled by direct adiabatic compression, because the relatively low volume of off-gas at low pressure precluded practical application of this compression principle. Thus, the addition of the gaseous carbon dioxide feed stream to the lowest pressure off-gas stream produces a highly advantageous new result, in that the compression of all of the off-gas may be carried out in substantially adiabatic compression means, including the relatively small volume of low pressure off-gas derived from the last stage of ammonium carbamate decomposition and off-gas generation.

It is an object of the present invention to produce urea in an improved and more efficient manner.

Another object is to provide an improved complete recycle process for urea synthesis.

A further object is to provide an improved process sequence for the direct recycle of off-gas to urea synthesis by adiabatic compression.

An additional object is to provide a process for the recycle of low pressure off-gas to urea synthesis, in which the low pressure off-gas is maintained in the gaseous state and adiabatically compressed together with a feed stream of gaseous carbon dioxide.

Still another object is to utilize the gaseous feed stream of carbon dioxide to provide added gas volume for the adiabatic compression of low pressure off-gas in urea synthesis.

Still a further object is to introduce a feed stream of gaseous carbon dioxide to a complete recycle urea synthesis process in an improved manner, by adding the gaeous carbon dioxide to mixed off-gas prior to direct recycle of the off-gas by adiabatic compression.

These and other objects and advantages of the present invention will become evident from the description which follows. Referring to the figure, a flowsheet showing a preferred embodiment of the present invention is provided. Ammonia feed stream 1, which will usually consist of liquid ammonia, is passed into pump 2 and is compressed to urea synthesis pressure, typically in the range of 140 to 350 kg./sq. cm. The resulting compressed ammonia feed stream 3 is added to compressed gaseous process stream 4 containing ammonia, carbon dioxide and water vapor. As will appear infra, stream 4 consists of the total process off-gas derived from ammonium carbamate decomposition, combined with a gaseous carbon dioxide feed stream.

The mixed process stream 5 derived from the combination of streams 3 and 4 is now passed into urea synthesis autoclave 6, and is reacted at an elevated temperature typically in the range of 150° C. to 230° C. and elevated pressure typically in the aforementioned range 140 to 350 kg./sq. cm., in order to form ammonium carbamate by the initial reaction between ammonia and carbon dioxide, and to dehydrate a portion of the ammonium carbamate to yield urea. The process stream in autoclave 6 is cooled during the reaction, usually by heat exchange with liquid water which is vaporized to produce usable process steam. Thus, liquid water stream 7 is passed into coil 8 within autoclave 6, and is vaporized to produce steam stream 9.

The synthesis effluent stream 10 derived from autoclave 6 contains urea, water, excess free ammonia and ammonium carbamate, and will usually also contain a small proportion of inerts such as nitrogen. In order to prevent a possible buildup of inerts concentration in the complete off-gas recycle sequence, the effluent stream 10 is preferably passed into retention vessel 11 which is maintained with an internal pressure substantially equal to the autogenous pressure of stream 10. Vessel 11 is provided with an upper heat exchange section 12, through which a coolant is passed via streams 13 and 14. The coolant 13 will preferably consist of liquid ammonia, in which case stream 14 will consist of ammonia vapor. The rising gas phase within vessel 11 passes upwards through heat exchange section 12, and the ammonia, carbon dioxide and water vapor components of the gas phase are condensed to liquid which passes downwards in vessel 11 and combines with the main body of liquid process stream in the lower part of vessel 11. Thus, the inerts gas component of stream 10 is removed from the upper part of vessel 11 via stream 15 and is free of process components. Inerts stream 15 passes through pressure control valve 16, and is discharged to atmosphere via stream 17.

The resulting liquid process stream 18, now substantially free of inerts, is withdrawn from vessel 11 and passed through pressure reducing valve 19. The liquid process stream 20 discharged from valve 19 will typically be at a pressure in the range of 35 to 70 kg./sq. cm. and is now passed into ammonium carbamate decomposer vessel 21. The liquid process stream is heated in vessel 21, typically at a temperature in the range of 150 to 200° C. to decompose a portion of the contained ammonium carbamate and generate an off-gas containing ammonia, carbon dioxide and water vapor. Thus, a heating fluid such as steam is passed via stream 22 into coil 23 inside vessel 21, with removal of cooled heating medium via stream 24. When stream 22 consists of steam, stream 24 will consist of liquid condensate water. The resulting mixed gas-liquid stream 25 is removed from vessel 21, and is passed into off-gas separator 26, which consists of any suitable means for separating a gas from a liquid, such as a baffled or cyclonic vessel. The off-gas component of stream 25 is thus removed from separator 26 via stream 27, while the residual liquid phase is removed from separator 26 via stream 28.

The residual liquid process stream 28 is passed through pressure reducing valve 29, and the liquid process stream 30 discharged from valve 29 will typically be at a pressure in the range of 7 to 28 kg./sq. cm. Stream 30 is now passed into ammonium carbamate decomposer vessel 31, which has a configuration and function similar to vessel 21 described supra. Thus, the liquid process stream 30 is heated in vessel 31 at a temperature typically in the range of 100° C. to 170° C., with concomitant further decompositon of ammonium carbamate and formation of an off-gas component. Heating steam stream 32 is passed into coil 33 for heat exchange with the liquid process stream, with condensate removal via stream 34. The resulting mixed gas-liquid stream 35 is removed from vessel 31, and is passed into off-gas separator 36, which has a configuration and function similar to vessel 26 described supra. The off-gas component of stream 35 is thus removed from separator 36 via stream 37, while the residual liquid phase is removed from separator 36 via stream 38.

The residual liquid process stream 38 is passed through pressure reducing valve 39, and the liquid process stream 40 discharged from valve 39 will typically be at a pressure in the range of 1.1 to 7 kg./sq. cm. Stream 40 is now passed into ammonium carbamate decomposer vessel 41, which has a configuration and function similar to vessel 21 described supra. Thus, the liquid process stream 40 is heated in vessel 41 at a temperature typically in the range of 90° C. to 150° C., with concomitant final decomposition of residual ammonium carbamate and formation of a final off-gas component. Heating steam stream 42 is passed into coil 43 for heat exchange with the liquid process stream, with condensate removal via stream 44. The resulting mixed gas-liquid stream 45 is removed from vessel 41, and is passed into off-gas separator 46, which has a configuration and function similar to vessel 26 described supra. The off-gas component of stream 45 is thus removed from separator 46 via stream 47, while the residual liquid phase consisting of product aqueous urea solution is removed from separator 46 via stream 48 and passed to product utilization.

Low pressure off-gas stream 47 is of relatively low volume and pressure, and is not usable as produced for direct adiabatic compression to a higher pressure level. Consequently, in accordance with the present invention, gaseous carbon dioxide feed stream 49 is now added to off-gas stream 47, to produce mixed gaseous stream 50 of sufficient volume to be adiabatically compressed in a practical manner. The mixed gaseous stream 50 is now passed into suitable adiabatic compression means 51, which will in practice consist of substantially adiabatic axial or centrifugal compressor. Stream 50 is adiabatically compressed in unit 51, to a more highly elevated pressure typically in the range of 7 to 28 kg./sq. cm., and is discharged from unit 51 as stream 52, which is combined with stream 37. The resulting combined gaseous stream 53 is now adiabatically compressed in unit 54, which consists of suitable compression means similar to unit 51 described supra. The resulting compressed combined gaseous stream 55 is discharged from unit 54 at a pressure typically in the range of 35 to 70 kg./sq. cm., and is combined with stream 27 to form a total gaseous stream 56. The gaseous stream 56 is now adiabatically compressed in unit 57, which consists of suitable compression means similar to unit 51 described supra. The total gaseous stream 58 is discharged from unit 57 at urea synthesis pressure typically in the range of 140 to 350 kg./sq. cm. and a temperature typically in the range of 300° C. to 550° C.

Depending on the relative proportions of stream 3 and 58, stream 58 may now be directly recycled as stream 4, since the addition of liquid ammonia stream 3 to the gaseous process stream provides a cooling effect. However, in most instances it will be desirable to precool stream 58 prior to urea synthesis, in order to remove a portion of the heat of formation of ammonium carbamate and to attain an optimum urea synthesis temperature. Thus, stream 58 will usually be passed through coil 59 in gas cooler 60, in heat exchange with a suitable fluid coolant 61, which is passed into unit 60 and removed as heated coolant via stream 62. In most instances stream 61 will consist of water, in which case stream 62 will be recovered as usable process steam. The gaseous process stream 4 is thus produced at a temperature typically in the range of 175° C. to 275° C., and is recycled to urea synthesis as described supra.

Numerous alternatives within the scope of the present invention will occur to those skilled in the art. Thus, the ranges of process variables such as temperature and pressure enumerated supra constitute merely preferable ranges of these variables for optimum utilization of the process concepts of the present invention, and thus it will be evident that the process is operable under process conditions of temperature and pressure other than those enumerated supra. The process concept of the present invention is applicable to any urea synthesis process in which ammonium carbamate decomposition is carried out in one or more stages of reduced pressure, although optimum efficiency is attained in most instances when the ammonium carbamate decomposition and off-gas generation is carried out in three or more stages at successively reduced pressure, since in this manner compression power requirements are reduced due to conservation of pressure levels of off-gas.

The inert gas purger unit 11 may be of an alternative configuration similar to unit 71 described in U.S. patent application No. 246,747. Other alternative arrangements or means for removal of inert gas from the system, such as periodically purging a portion of the recycling off-gas, will occur to those skilled in the art. The off-gas streams 27, 37, and 47 may be produced by an initial flash separation of off-gas at reduced pressure levels, followed by heating of the liquid phase at each pressure level to produce further off-gas, which is combined with the initially produced off-gas at each pressure level to yield a single off-gas of reduced water vapor content, as described in U.S. Patent No. 3,172,911. The streams 9 and 62 consisting of usable process steam may be totally or partially employed as heating steam for ammonium carbamate decomposition, in which case streams 22, 32 and 42 would be derived from streams 9 or 62. The gaseous carbon dioxide feed stream 49 will usually be derived from a process source in which carbon dioxide is produced at relatively low pressure, such as by-product carbon dioxide from the production of ammonia synthesis gas. In this case, the initially available carbon dioxide will be compressed in additional compressor means, prior to addition to stream 47 as stream 49. Finally, in some cases due to limitations of material of construction, it will be preferable to reduce the initial gas stream temperature prior to each stage of adiabatic compression. This will be particularly desirable with respect to streams 52 and 55, which are produced at relatively elevated temperatures due to adiabatic compression. Thus in some cases streams 52 and 55 will be passed through gas coolers similar to unit 60 for interstage gas cooling with concomitant generation of usable process steam. As an alternative, small amounts of liquid ammonia may be injected into streams 52 and 55, with resultant vaporization of the liquid ammonia to produce a gas cooling effect. Likewise, in some instances liquid ammonia may be injected into the gas stream during compression in units 51, 54 and 57 to provide required temperature control based on limitations of materials of construction and also to prevent possible ammonia cracking due to excessive rise in temperature. These expedients may of course not be required if optimum balance with respect to the relative volumes of off-gas streams 27 and 37 is attained, since it will be evident that streams 27 and 37 serve to reduce the temperature level of streams 55 and 52 respectively. In some instances, the gaseous process stream 58 may be partially condensed to liquid in coil 59, and thus stream 4 may contain a liquid phase.

An example of an industrial application of the process of the present invention will now be described.

Example

The process of the present invention was applied to a complete recycle facility, to produce 1500 metric tons per day of urea, with an overall molar ratio of ammonia to carbon dioxide during urea synthesis of 4 to 1, and urea synthesis reaction conditions of 182° C. and 226 kg./sq. cm. Following are the compositions and process conditions for major process streams as described supra and illustrated in the figure.

| Stream No. | Composition, Metric Ton-Moles/Day | | | | Temp., °C. | Pressure, kg./sq. cm. |
|---|---|---|---|---|---|---|
| | Ammonia | Carbon Dioxide | Water | Urea | | |
| 1 | 50 | | | | 0 | 14 |
| 4 | 88.8 | 34.70 | 12.145 | | 204 | 226 |
| 5 | 138.8 | 34.7 | 12.145 | | 182 | 226 |
| 10 | 88.8 | 9.7 | 37.145 | 25 | 182 | 226 |
| 20 | 88.8 | 9.7 | 37.145 | 25 | 177 | 48 |
| 27 | 26.66 | 2.915 | 1.525 | | 177 | 48 |
| 37 | 57.7 | 6.30 | 7.125 | | 135 | 10.1 |
| 47 | 4.44 | 0.485 | 3.495 | | 115 | 2.1 |
| 48 | | | 25 | 25 | 115 | 2.1 |
| 49 | | 25 | | | 92 | 2.1 |
| 50 | 4.44 | 25.485 | 3.495 | | 101 | 2.1 |
| 52 | 4.44 | 25.485 | 3.495 | | 267 | 10.1 |
| 53 | 62.14 | 31.785 | 10.62 | | 180 | 10.1 |
| 55 | 62.14 | 31.785 | 10.62 | | *377 | 48 |
| 56 | 88.8 | 34.70 | 12.145 | | 177 | 48 |
| 58 | 88.8 | 34.70 | 12.145 | | 372 | 226 |

*Cooled to 177° C. by heat exchange with water before addition to stream 27.

I claim:

1. A process for urea synthesis with total recycle of unconverted process components which comprises adding an ammonia feed stream at elevated pressure to a gaseous process stream containing ammonia, carbon dioxide and water vapor, reacting the resulting process stream at elevated temperature and pressure whereby urea is formed, heating the resulting process stream at reduced pressure to generate an off-gas containing ammonia, carbon dioxide and water vapor, separating said off-gas from product aqueous urea solution, adding a gaseous carbon dioxide feed stream to said off-gas, and adiabatically compressing the resulting mixed gas stream to form said gaseous process stream.

2. A process for urea synthesis with total recycle of unconverted process components which comprises adding a liquid ammonia feed stream at elevated pressure to a gaseous process stream containing ammonia, carbon dioxide and water vapor, reacting the resulting process stream at elevated temperature and pressure while in heat exchange with liquid water, whereby urea is formed in said process stream and said liquid water is vaporized to steam, heating the resulting process stream at reduced pressure to generate an off-gas containing ammonia, carbon dioxide and water vapor, separating said off-gas from product aqueous urea solution, adding a gaseous carbon dioxide feed stream to said off-gas, adiabatically compressing the resulting mixed gas stream to elevated temperature and urea synthesis pressure, and cooling the resulting mixed gas stream to form said gaseous process stream.

3. The process of claim 2, in which said steam is passed in indirect heat exchange relationship with said resulting process stream at reduced pressure, whereby said steam is condensed and said resulting process stream is heated to generate said off-gas.

4. The process of claim 2, in which said resulting mixed gas stream is cooled to form said gaseous process stream by indirect heat exchange relationship with liquid water which is thereby vaporized to steam.

5. A process for urea synthesis with total recycle of unconverted process components which comprises adding an ammonia feed stream at elevated pressure to a gaseous process stream containing ammonia, carbon dioxide and water vapor, reacting the resulting process stream at elevated temperature and pressure whereby urea is formed, heating the resulting process stream in a plurality of stages at successively reduced pressure levels to generate a plurality of off-gas streams containing ammonia, carbon dioxide and water vapor, separating the off-gas stream from the residual liquid process stream at each stage, whereby the residual liquid process stream from the lowest pressure stage comprises product aqueous urea solution, adding a gaseous carbon dioxide feed stream to at least one of said off-gas streams, adiabatically compressing said off-gas streams to urea synthesis pressure in a plurality of compression means whereby the off-gas stream at each pressure level is compressed to the next higher pressure level, combined with off-gas produced at the higher pressure level, and the combined off-gas stream is further compressed to the succeeding higher pressure level and recycling the compressed combined off-gas stream as said gaseous process stream.

6. The process of claim 5, in which said gaseous carbon dioxide feed stream is added to the off-gas stream derived from the lowest pressure stage.

7. A process for urea synthesis with total recycle of unconverted process components which comprises adding a liquid ammonia feed stream at elevated pressure to a gaseous process stream containing ammonia, carbon dioxide and water vapor, reacting the resulting process stream at elevated temperature and pressure while in heat exchange with liquid water, whereby urea is formed in said process stream and said liquid water is vaporized to steam, heating the resulting process stream in a plurality of stages at successively reduced pressure levels to generate a plurality of off-gas streams containing ammonia, carbon dioxide and water vapor, separating the off-gas stream from the residual liquid process stream at each stage, whereby the residual liquid process stream from the lowest pressure stage comprises product aqueous urea solution, adding a gaseous carbon dioxide feed stream to the off-gas stream derived from the lowest pressure stage, adiabatically compressing said off-gas streams to elevated temperature and urea synthesis pressure in a plurality of compression means whereby the off-gas stream at each pressure level is compressed to the next higher pressure level, combined with off-gas produced at the higher pressure level, and the combined off-gas stream is further compressed to the succeeding higher pressure level, cooling the compressed combined off-gas stream, and recycling the cooled combined off-gas stream as said gaseous process stream.

8. The process of claim 7, in which said steam is passed in indirect heat exchange relationship with said resulting process stream in said plurality of heating stages, whereby said steam is condensed and said resulting process stream is heated to generate said plurality of off-gas streams.

9. The process of claim 7, in which said resulting compressed combined off-gas stream is cooled to form said gaseous process stream by indirect heat exchange relationship with liquid water which is thereby vaporized to steam.

10. The process of claim 7, in which a portion of said liquid ammonia feed stream is added to said combined off-gas stream before further compression of said combined off-gas stream, whereby said portion of said liquid ammonia feed stream is vaporized into said combined off-gas combined off-gas stream and said combined off-gas stream is cooled.

11. The process of claim 10, in which the number of stages at successively reduced pressure levels in which said resulting process stream is heated is three.

12. A process for urea synthesis with total recycle of unconverted process components which comprises adding a liquid ammonia feed stream at a pressure in the range of 140 to 350 kg./sq. cm. to a gaseous process stream containing ammonia, carbon dioxide and water vapor, reacting the resulting process stream at a temperature in the range of 150° C. to 230° C. and pressure in the range of 140 to 350 kg./sq. cm. while in indirect heat exchange relationship with liquid water, whereby urea is formed in said process stream and said liquid water is vaporized to steam, heating the resulting process stream at a temperature in the range of 150° C. to 200° C. and reduced pressure in the range of 35 to 70 kg./sq. cm. to generate a first off-gas stream, separating said first off-gas stream from the residual liquid process stream, heating the residual liquid process stream at a temperature in the range of 100° C. to 170° C. and reduced pressure in the range of 7 to 28 kg./sq. cm. to generate a second off-gas stream, separating said second off-gas stream from the residual liquid process stream, heating the residual liquid process stream at a temperature in the range of 90° C. to 150° C. and reduced pressure in the range of 1.1 to 7 kg./sq. cm. to generate a third off-gas stream, separating said third off-gas stream from the residual liquid process stream comprising product aqueous urea solution, adding a gaseous carbon dioxide feed stream to said third off-gas stream, adiabatically compressing the resulting mixed gaseous stream to a pressure in the range of 7 to 28 kg./sq. cm., adding said second off-gas to the compressed mixed gaseous stream, adiabatically compressing the resulting combined gaseous stream to a pressure in the range of 35 to 70 kg./sq. cm., adding said first off-gas to the compressed combined gaseous stream, and adiabatically compressing the resulting total gaseous stream to urea synthesis pressure in the range of 140 to 350 kg./sq. cm. to form said gaseous process stream.

13. The process of claim 12, in which the resulting total gaseous stream is cooled after compression to urea synthesis pressure and prior to addition of said liquid ammonia feed stream, from an initial temperature in the range of 300° C. to 550° C. to a lower final temperature in the range of 175° C. to. 275° C.

14. The process of claim 13, in which the resulting total gaseous stream is cooled by indirect heat exchange relationship with liquid water, said liquid water being thereby vaporized to steam.

15. The process of claim 12, in which said steam is passed in heat exchange with said resulting process stream, whereby said resulting process stream is heated at a temperature in the range of 150° C. to 200° C. and said steam is condensed.

16. The process of claim 12, in which said steam is passed in heat exchange with said residual liquid process stream, whereby said residual liquid process stream is heated and said steam is condensed.

References Cited

UNITED STATES PATENTS 3,301,897   1/1967   Cook _____ 260—555

HENRY R. JILES, *Primary Examiner.*